United States Patent [19]

Tsukahara et al.

[11] Patent Number: 4,970,487
[45] Date of Patent: Nov. 13, 1990

[54] PRESSURE SENSOR

[75] Inventors: Makoto Tsukahara, Kariya; Yukihiro Kato, Chiryu; Yoshitaka Itoh, Nagoya; Tetsuo Oka, Obu, all of Japan

[73] Assignee: Aisin Seiki Kabushiki Kaisha, Kariya, Japan

[21] Appl. No.: 282,639

[22] Filed: Dec. 12, 1988

[30] Foreign Application Priority Data

Dec. 11, 1987 [JP] Japan ............................ 62-314824

[51] Int. Cl.$^5$ .............................................. G01L 1/22
[52] U.S. Cl. ........................................... 338/5; 338/2;
338/4; 204/192.21; 29/621.1
[58] Field of Search ...................... 338/4, 5, 2, 36, 42;
204/192.21, 192.38; 29/621.1

[56] References Cited

U.S. PATENT DOCUMENTS 4,503,709  3/1985  Ruhle .................................. 338/4 X
4,763,097  8/1988  Kant et al. ........................... 338/4 X Primary Examiner—Bruce A. Reynolds
Assistant Examiner—Marvin M. Lateef
Attorney, Agent, or Firm—Banner, Birch, McKie & Beckett

[57] ABSTRACT

A sensor is provided for detecting a physical quantity such as fluid pressure and acceleration of a mass and converting same into electrical signals. The sensor has a diaphragm made of a metal deformable by the physical quantity, a layered constructed insulating means of an insulating material which is formed on the diaphragm by means of a physical vapor desposition process, wherein the layered constructed insulating means has at least two insulating material layers, a strain gauge formed on the layered constructed insulating means opposite the diaphragm by means of a physical vapor deposition process, and a contact zone on the strain gauge to provide an electrical connection for a physical quantity sensing device to the sensor. Due to the layered construction of the insulating means, the thickness of the insulating means as a whole may be reduced below that of a single layer insulating means and maintain good insulative properties particularly at excessive strain.

9 Claims, 1 Drawing Sheet

PRESSURE SENSOR

FIELD OF THE INVENTION

The present invention relates to a sensor for converting fluid pressure, acceleration of a mass or other similar physical quantity into electrical signals and more particularly to a sensor which detects such a physical quantity, for example fluid pressure, by means of a diaphragm and converts distortions of the diaphragm into electrical signals.

BACKGROUND OF THE INVENTION

A conventional pressure sensor is disclosed in U.S. Pat. No. 4,500,864. In one embodiment therein, a strain gauge of amorphous metal material is formed directly on the diaphragm by, for example, sputtering. The diaphragm is of an insulating type material such as ceramic or glass materials. However, due to the materials utilized for the diaphragm, for example glass materials, the electrical output of the sensor versus the pressure exerted upon the sensor experiences a hysteresis effect. Additionally at a constant pressure exerted upon the sensor, the electrical output with respect to time-elapse of the sensor is not consistent due to the elasticity of the glass material utilized for the diaphragm.

Also disclosed in U.S. Pat. No. 4,500,864 is an alternative embodiment wherein the diaphragm is of an electrically conductive material and an insulating layer is formed onto the diaphragm and onto the insulating layer is subsequently formed the strain gauge by, for example, physical vapor deposition. As is readily apparent, the insulating material is interposed between the strain gauge and the diaphragm so as to insure the insulation therebetween. Though the thickness of the insulating material is not detailed in the specification of U.S. Pat. No. 4,500,864, a commercial embodiment thereof has insulating material having a thickness of 10 to 15 microns. However, at such thicknesses of the insulating material, the insulating material is subject to separation from the diaphragm upon excessive deformation of the diaphragm.

Thus there exist the need for such a sensor which does not suffer from hysteresis or elasticity effects due to the diaphragm composition and which does not suffer from insulating material separation from the diaphragm upon excessive deformation of the diaphragm.

SUMMARY OF THE INVENTION

It is, therefore a principal object of the present invention to provide a sensor without the aforementioned drawbacks.

Another object of the present invention is to provide a sensor having a diaphragm composed of a material which substantially does not exhibit hysteresis effects or elasticity effects when utilized in such a sensor.

A further object of the present invention is to provide a sensor which is less susceptible to separation of the insulating material from the diaphragm upon excessive deformation of the diaphragm than such sensors known in the prior art.

Yet another object of the present invention is to provide a sensor having a thin insulating material of layered construction to be interposed between the diaphragm and the strain gauge, thereby minimizing the susceptibility of the insulating material separating from the diaphragm upon excessive deformation of the diaphragm.

To achieve the objects in accordance with the purposes of the present invention, a sensor for detecting a physical quantity such as acceleration of a mass or fluid pressure and converting same into electrical signals, the sensor comprising a diaphragm made of a metal deformable by the physical quantity, a layered constructed insulating means of an insulating material which is formed on the diaphragm by means of a physical vapor deposition process, wherein the layered constructed insulating means comprises at least two insulating material layers wherein a first insulating material layer is formed on the diaphragm and each additional insulating material layer is formed on the immediately preceding insulating material layer opposite the diaphragm, a strain gauge formed on the layered constructed insulating means opposite the diaphragm by means of a physical vapor deposition process so as to detect the deformation of the diaphragm, and a contact zone on the strain gauge so as to provide an electrical connection for a physical quantity sensing device to the sensor Accordingly these and other features and advantages of the present invention will become apparent from the following detailed description, wherein reference is made to the figures in the accompanying drawings.

IN THE DRAWINGS

DETAILED DESCRIPTION OF THE PREFERRED EMBODIMENTS

Figure 1:
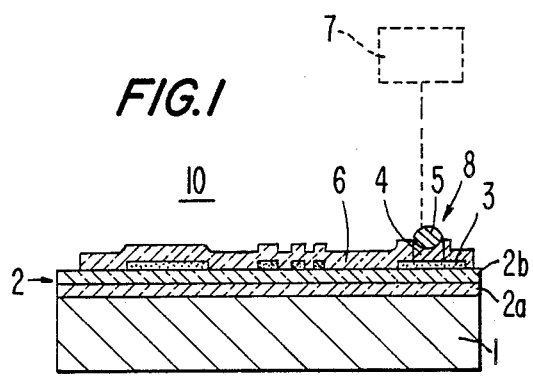
FIG. 1 is a cross sectional view of a sensor according to a first embodiment of the present invention.
Figure 2:
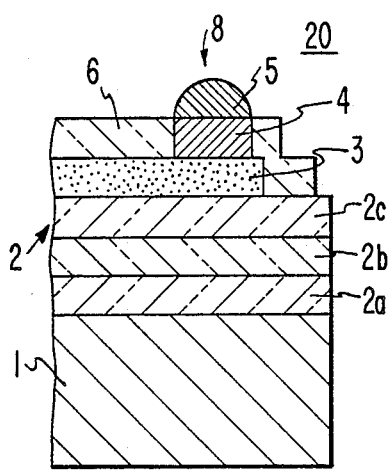
FIG. 2 is a partial cross sectional view of a sensor according to a second embodiment of the present invention.

Referring now to the drawings in which like numerals denote similar elements, and more particularly to FIG. 1, there is shown by way of illustration, but not of limitation, a pressure sensor 10 is provided with a diaphragm 1 made of a material which does not suffer the hysteresis or elasticity effects of the prior art, such as a metal material. An example of a suitable metal material is stainless steel for example SUS304, SUS630 all of which are detailed in JIS (Japanese Industrial Standard). The surface roughness of the diaphragm 1 is formed at 0.1 microns by for example buffing. A layered constructed insulating means 2 is formed by a vapor deposition process onto the diaphragm 1. The layered constructed insulating means 2 has at least two (2) layers. In FIG. 1, the layered constructed insulating means 2 of the pressure sensor 10 has a first insulating material layer 2a and a second insulating material layer 2b. In FIG. 2, an alternative embodiment of a sensor 20 of the present invention is shown with the layered constructed insulating means 2 having a first insulating material layer 2a, a second insulating material layer 2b, and a third insulating material layer 2c. Each of the insulating material layers of the layered constructed insulating means 2 may be of the same or different insulating material, preferably of the same insulating material. The insulating material is utilized in the layered constructed insulating means 2 may be any substantially non-conductive material which may be deposited by a physical vapor deposition process. Examples of suitable materials are ceramic materials. By "ceramic material" it is intended a highly stable material which is substantially electrically non-conductive and has a crystalline structure consisting of metal or silicon and non-metal elements. The non-metal element is commonly and preferably oxygen or nitrogen, although it may be also carbon, boron, sulfur or a halogen. Examples of suitable ceramic materials would include, but are not limited to, $SiO_2$, $Al_2O_3$, $Ta_2O_5$, AlN and $Si_3N_4$. $SiO_2$ is preferred when the same insulating material is used for each of the insulating material layers of the layered constructed insulating means 2. If more than one insulating material is to be utilized in forming the layered constructed insulating means, then the insulating materials utilized are preferably selected from at least two different ceramic materials selected from the group consisting of $SiO_2$, $Al_2O_3$, $Ta_2O_5$, AlN and, $Si_3N_4$.

A physical vapor deposition process is a general term for thin film techniques such as evaporating, sputtering, and ion-plating, which are well known to those skilled in the art.

In FIG. 1, the layered constructed insulating means 2 for example may be prepared by sputtering the first insulating material layer 2a onto the diaphragm 1 which has preferably been cleaned for example by utilizing an ultrasonic method for a suitable length of time. The diaphragm 1 with the first insulating material layer 2a thereon is then recleaned such as by utilizing an ultrasonic method and the second insulating material layer 2b is sputtered onto the first insulating material layer 2a. Similarly, as shown in FIG. 2 the third insulating material layer 2c may be provided on the second insulating material layer 2b.

A strain gauge 3 is formed onto the layered constructed insulating means 2 by a physical vapor deposition process such as those utilized to form the layered constructed insulating means 2 onto the diaphragm 1. As shown in FIG. 1, the strain gauge 3 is formed upon the second insulating material layer 2b or as shown in FIG. 2 on the third insulating material layer 2c. The strain gauge 3 may have any suitable geometry or pattern and/or thickness. As such, the strain gauge 3 may be formed utilizing materials and the methods indicated in U.S. Pat. No. 4,500,864, which is hereby incorporated herein by reference. Examples of suitable raw materials for the strain gauge 3 are nickel-chromium-silicon materials and nickel-silicon-boron materials.

Thereafter, a contact zone 8 is formed on the strain gauge 3. The contact zone may comprise as shown in FIG. 1 a film 4 of an electrically conductive metal such as iron and solder connection 5 formed thereon. The strain gauge 3 may then be electrically connected to a physical quantity sensing device 7 via the contact zone 8. Preferably, as shown in FIG. 1, the strain gauge 3 is protected by a thin insulating material film 6 which is substantially electrically nonconductive and suitable materials therefor are such as those utilized for the layered constructed insulating means 2. The thin film 6 may be applied in any suitable manner, preferably by a physical vapor deposition process. The thin film 6 is preferably of the material $SiO_2$.

As mentioned above, the layered constructed insulating means 2 between the diaphragm 1 and the strain gauge 3 is in the form of a layered construction, which allows the decreasing of the thickness of the insulating means 2 as a whole relative to the thickness attainable with a single layered insulating means of the prior art without suffering separation from the diaphragm 2 and maintaining good insulative characteristics.

The following examples are for illustrative purposes only and are not meant to limit the claimed invention in any manner.

EXAMPLES

In the following examples, pressure sensors according to the present invention and as those disclosed by U.S. Pat. No. 4,500,864 were prepared.

EXAMPLE I

The effect of layered construction of insulating means on the overall thickness thereof.

In this example, the effect of the layered construction of the insulating means according to the present invention was evaluated in comparison to the single layered insulating means utilized in the prior art. A plurality of sensors and comparative sensors were prepared varying the number of insulating material layers and the overall thickness of the insulating material means. The diaphragm utilized was a stainless steel and the insulating material utilized for the various insulating layers was $SiO_2$. Substantially similar strain gauge design and material were employed on each of the sensors and comparative sensors. The cross sectional configuration of the respective sensors whether of the present invention or of a comparative sensor, were analogous to that of FIG. 1 herein with the number of insulating material layers of the insulating means 2 being varied. The metal film 4 was iron and the thin film 6 was of $SiO_2$. Sputtering was utilized to form the various layers upon the diaphragm 1. Prior to sputtering each successive layer whether of insulating material or of the strain gauge, the surface upon which the material was to be sputtered upon was cleaned for about 5 minutes utilizing an ultrasonic method. In the multi-layered constructed sensors according to the present invention, the thicknesses of the respective layers was approximately equal though not necessarily having to be so for the purposes of the present invention. The overall thickness of the insulating means was varied between 0.5 to 3.0 microns.

The effect of the layered configuration in the insulating means 2 of the present invention may be readable from the following table.

TABLE

| Total Thickness of Insulating means (microns) | Number of Insulating Material Layers in the insulating means[a] | | |
|---|---|---|---|
| | 1[b] | 2[c] | 3[c] |
| 0.5 | B | B | B |
| 0.75 | B | U | G |
| 1.0 | B | G | G |
| 2.0 | U | G | G |

TABLE-continued

| Total Thickness of Insulating means (microns) | Number of Insulating Material Layers in the insulating means[a] | | |
|---|---|---|---|
| | 1[b] | 2[c] | 3[c] |
| 3.0 | G | G | G |

[a]Test was performed until strain of 2500, wherein the letters in the Table indicate the following insulative properties were obtained:
B - Insulation was bad.
U - Insulation was sometimes good and sometimes bad.
G - Insulation was good.
[b]Results of comparative sensor.
[c]Results using layered constructed insulating means.

As is readily apparent from the table, by utilizing the layered constructed insulating means of the present invention, the overall thickness of the insulating means may be reduced below that capable of a single layered insulating means and maintain good insulative properties. Another foreseen benefit would be the reduction of material costs and also sputtering costs.

EXAMPLE II

The Effect of Diaphragm Material

In this example, the effect of the diaphragm material is investigated. A sensor embodying the present invention and a comparative sensor were prepared wherein the sensor embodying the present invention utilized a metal diaphragm and the comparative sensor utilized a glass diaphragm both of which had a cross sectional configuration as shown in FIG. 1. The metal diaphragm was of a stainless steel. The insulating material utilized for the various layers of the insulating means 2 and the thin layer 4 were of $SiO_2$. The film 4 was of iron. A sputtering techniques was utilized as in Example I hereof. The total thickness of the insulating means in both the sensor embodying the present invention and of the comparative sensor were substantially the same.

Figure 3:
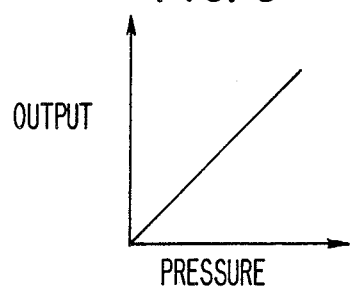
FIG. 3 is a graph showing the characteristics of the sensor in FIG. 1 in connection with the relationship between the electrical output of the sensor and the pressure exerted on the diaphragm.
Figure 4:
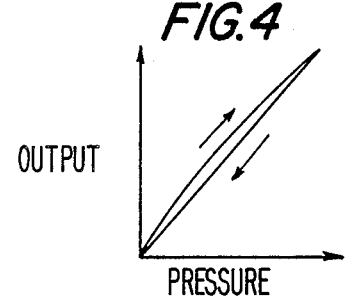
FIG. 4 is a graph showing the characteristics of a sensor similar to the sensor in FIG. 1 between the electrical output of the sensor and the pressure exerted on the diaphragm except that the sensor utilized herein has a diaphragm made of glass.

FIG. 3 is a graph showing the characteristics of the sensor embodying the present invention in connection with the relationship between the electrical output thereof and the pressure exerted upon the diaphragm thereof. FIG. 4 is a graph showing the same characteristics of the comparative sensor over the same pressure range. As is readily apparent from FIG. 4, the comparative sensor utilizing the glass diaphragm suffered from hysteresis effects. Whereas the sensor embodying the present invention utilizing the metal diaphragm did not suffer from hysteresis effects.

Figure 5:
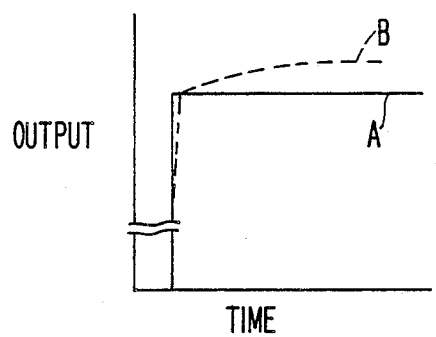
FIG. 5 is a graph showing the characteristics of the sensor in FIG. 1 in connection with the relationship between the electrical output of the sensor relative to time at a constant pressure exerted on the diaphragm of the sensor, wherein the graph A therein utilized a sensor having a metal diaphragm and the graph B therein utilized a sensor having a glass diaphragm.

Furthermore, in FIG. 5 there is shown a graph of the characteristics of the sensor embodying the present invention (graph A) and of the comparative sensor (graph B) in connection with the relationship between the electrical output of each relative to time at a constant pressure exerted upon the respective diaphragms thereof. As is readily apparent from graph B of FIG. 5, the comparative sensor utilizing the glass diaphragm had poor consistency of electrical output thereof with respect to time-elapse at constant pressure due to the elasticity of the glass material in the diaphragm thereof. Furthermore, it is readily apparent from graph A of FIG. 5 that the sensor embodying the present invention utilizing the metal diaphragm did not suffer such elasticity effects.

It will apparent from the foregoing that many other variations and modifications may be made in the apparatus and methods herein before described, by those having experience in this technology, without departing from the concept of the present invention. Accordingly, it should be clearly understood that the apparatus and methods depicted in the accompanying drawings and referred to in the foregoing description are illustrative only and not intended to have limitations on the scope of the invention.

What is claimed is:

1. A sensor for detecting a physical quantity and converting same into electrical signals, said sensor comprising:
   (a) a diaphragm made of a metal deformable by said physical quantity;
   (b) a layered constructed insulating means of an insulating material which is formed on said diaphragm by means of a physical vapor deposition process, wherein said layered constructed insulating means comprises at least two insulating material layers wherein a first insulating material layer is formed on said diaphragm and each additional insulating material layer is formed on the immediately preceding insulating material layer opposite said diaphragm;
   (c) a strain gauge formed on said layered constructed insulating means opposite said diaphragm by means of a physical vapor deposition process so as to detect the deformation of said diaphragm, and
   (d) a contact zone on said strain gauge so as to provide an electrical connection for a physical quantity sensing device to said sensor.

2. The sensor according to claim 1, wherein each of said at least two insulating material layers is of the same insulating material.

3. The sensor according to claim 1, wherein each of said at least two insulating material layers is of a different insulating material.

4. The sensor according to claim 1, wherein the insulating material of said layered constructed insulating is a ceramic material.

5. The sensor according to claim 4, wherein said ceramic material is selected from the group consisting of $SiO_2$, $Al_2O_3$, $Ta_2O_5$, AlN and $Si_3N_4$.

6. The sensor according to claim 4, wherein said ceramic material is any two ceramic materials selected from the group consisting of $SiO_2$, $Al_2O_3$, $Ta_2O_5$, AlN and $Si_3N_4$.

7. The sensor according to claim 1, wherein said metal is a stainless steel.

8. The sensor according to claim 1, wherein said physical quantity is a fluid pressure.

9. The sensor according to claim 1, wherein said physical quantity is an acceleration of a mass.

* * * * *